US012680493B2

(12) United States Patent
Weston et al.

(10) Patent No.: US 12,680,493 B2
(45) Date of Patent: Jul. 14, 2026

(54) EXHAUST ASSEMBLY WITH AN EXHAUST COMPONENT

(71) Applicant: Ford Global Technologies, LLC, Dearborn, MI (US)

(72) Inventors: Keith Weston, Canton, MI (US); Calvin Trescott, Northville, MI (US); Daniel Corless, Allen Park, MI (US); Stuart Jamieson, Ann Arbor, MI (US); Michael Furst, Oak Park, MI (US); David D. Friske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 18/983,725

(22) Filed: Dec. 17, 2024

(65) Prior Publication Data

US 2026/0168427 A1     Jun. 18, 2026

(51) Int. Cl.
*F01N 13/18* (2010.01)
*B33Y 80/00* (2015.01)
*F01N 13/08* (2010.01)

(52) U.S. Cl.
CPC ....... *F01N 13/1805* (2013.01); *F01N 13/082* (2013.01); *B33Y 80/00* (2014.12); *F01N 2260/02* (2013.01)

(58) Field of Classification Search
CPC . B60D 1/58; B60D 1/52; B60D 1/565; B60D 1/167; B60D 1/485; B60D 1/44; B60D 1/00; B60D 1/14; B60D 1/54
See application file for complete search history.

(56) References Cited

U.S. PATENT DOCUMENTS

| | | | |
|---|---|---|---|
| 7,753,396 B2 | 7/2010 | Jamieson et al. | |
| 2003/0011169 A1* | 1/2003 | McCoy .................... | B60D 1/52 |
| | | | 280/495 |

FOREIGN PATENT DOCUMENTS

| | | | |
|---|---|---|---|
| DE | 19923736 C1 | | 4/2001 |
| JP | S603217 U | * | 1/1985 |
| JP | H0649108 U | * | 7/1994 |
| JP | H09137723 A | | 5/1997 |
| WO | 2008128603 A1 | | 10/2008 |

OTHER PUBLICATIONS

English Translation JP-S603217-U (Year: 1985).*
English Translation JP-H0649108-U (Year: 1994).*
https://web.archive.org/web/20240916014035/https://www.rockhard4x4.com/product_p/rh-90505.htm (Year: 2024).*

* cited by examiner

*Primary Examiner* — Anthony Ayala Delgado
(74) *Attorney, Agent, or Firm* — McCoy Russell LLP

(57) ABSTRACT

Methods and systems are provided for an exhaust component. The exhaust component includes, in one example, a hooked portion configured as a tow hook and/or as a jack interface. In the exhaust component, the hooked portion is positioned adjacent to an exhaust conduit tip and the hooked portion does not extend directly across the exhaust conduit tip.

20 Claims, 4 Drawing Sheets

EXHAUST ASSEMBLY WITH AN EXHAUST COMPONENT

FIELD

The present description relates generally to exhaust systems with an exhaust component that exhibits multi-use functionality.

BACKGROUND/SUMMARY

Internal combustion engine vehicles include exhaust systems that receive gases from the engine and ultimately expel the gasses into the surrounding environment. Some exhaust systems include exhaust tips that allow exhaust gas to be expelled into the surrounding environment. Some exhaust tips have been arranged in relatively exposed locations in the vehicle.

The inventors have recognized a desired to increase the durability of the exhaust tips and well as expand the functionality of the exhaust conduit tips or areas of the vehicle around the exhaust conduit tips. Specifically, the inventors have also recognized that the use of accessories (e.g., off-road accessories) may be desired by the customer such as towing components, mounts, and interfaces for lift jacks. Exhaust tip durability may be particularly desirable when the vehicle is traveling in off-road environments.

In one example, the desirable characteristics described above may be at least partially achieved by an exhaust component that is mounted in a vehicle chassis. The exhaust component, in one example, includes a hooked portion that is configured as a tow hook and/or as a jack interface. In the exhaust component, the hooked portion is positioned adjacent to an exhaust conduit tip and the hooked portion does not extend directly across the exhaust conduit tip. In this way, the exhaust component is able to achieve multiple functions such as protecting the exhaust tip, functioning as a tow point, and functioning as a lift jack interface.

As one example, the exhaust component may further include an accessory mount for mounting accessories such as a pole. In this way, the exhaust component's functionality is further expanded, thereby increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
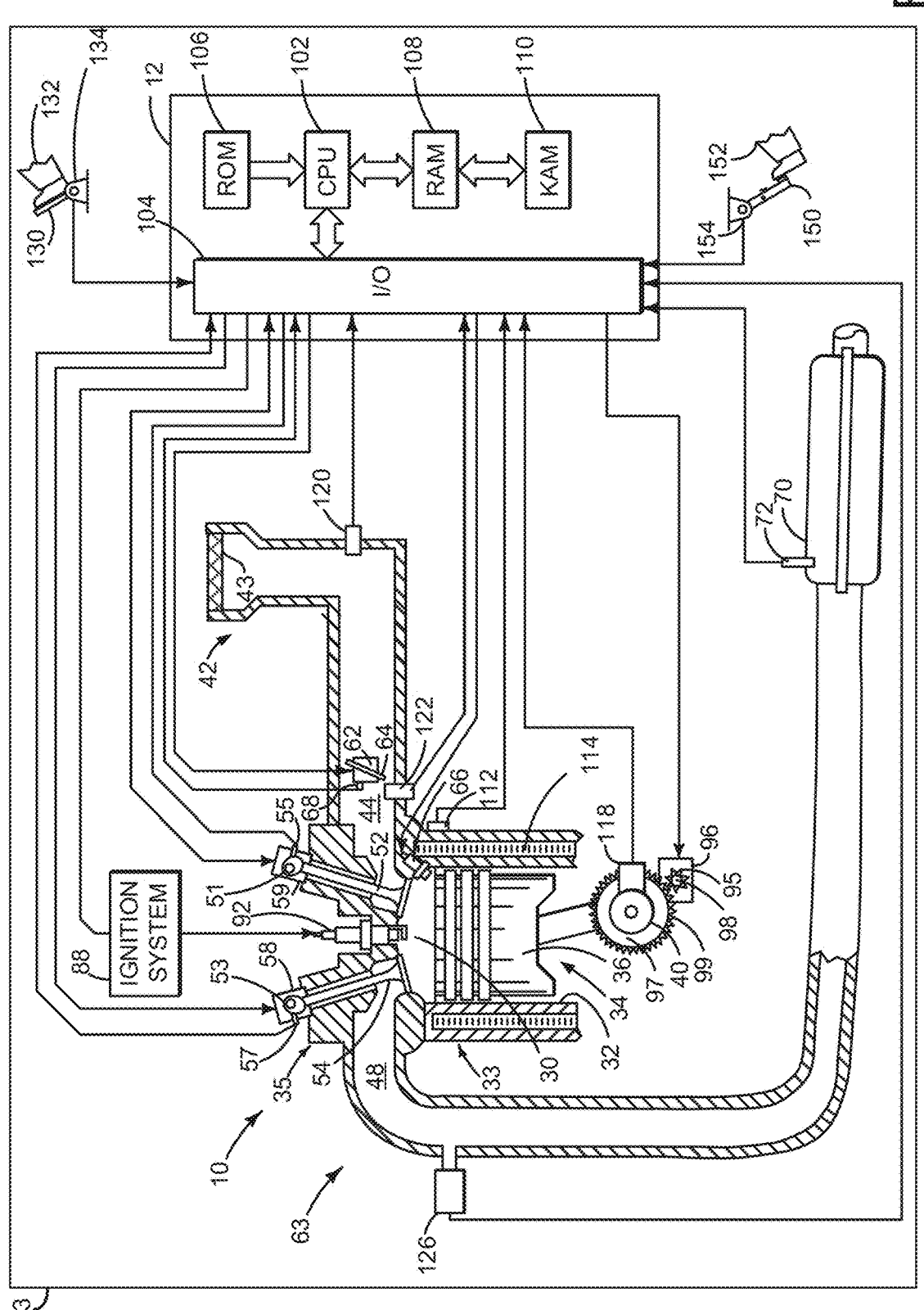
FIG. 1 shows a schematic of an engine system for a vehicle system.
Figure 2:
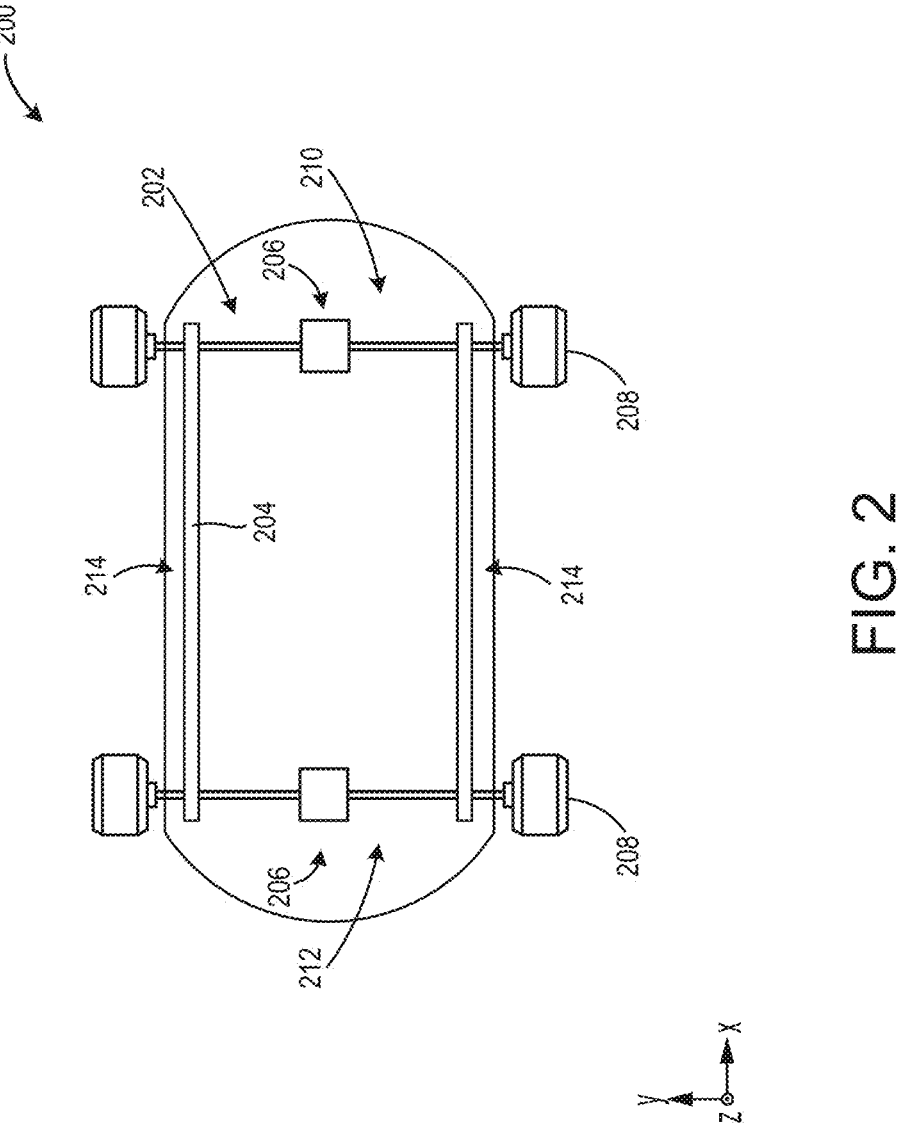
FIG. 2 shows an example of a vehicle system.
Figure 3:
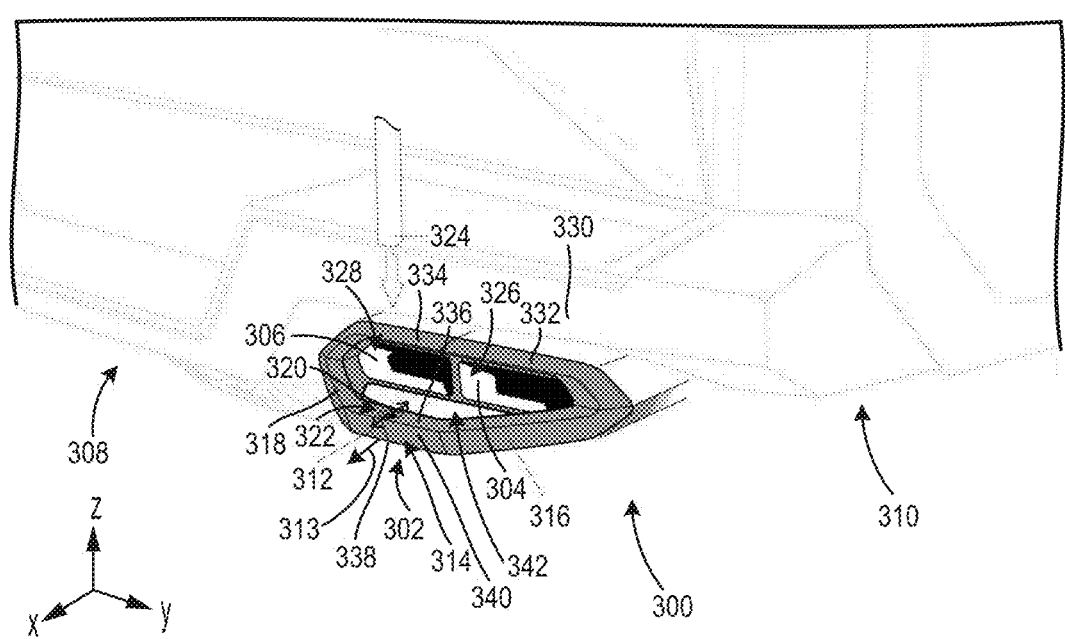
FIG. 3 shows an example of an exhaust component attached to a vehicle chassis.
Figure 4:
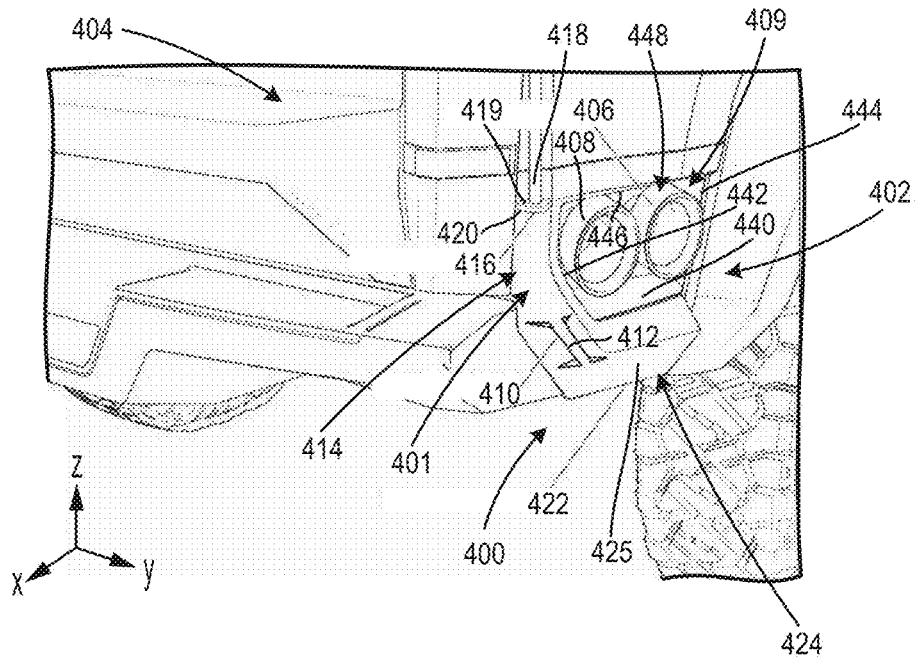
FIG. 4 shows another example of an exhaust component attached to a vehicle chassis.
Figure 5:
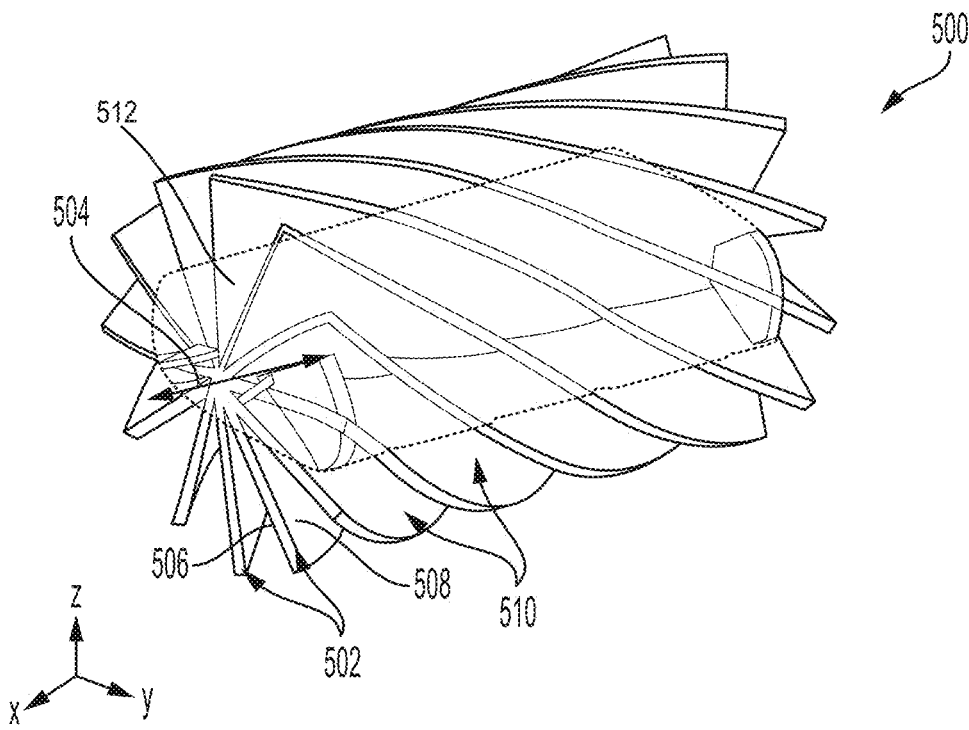
FIG. 5 shows an example of a spiral device for an exhaust assembly.
Figure 6:
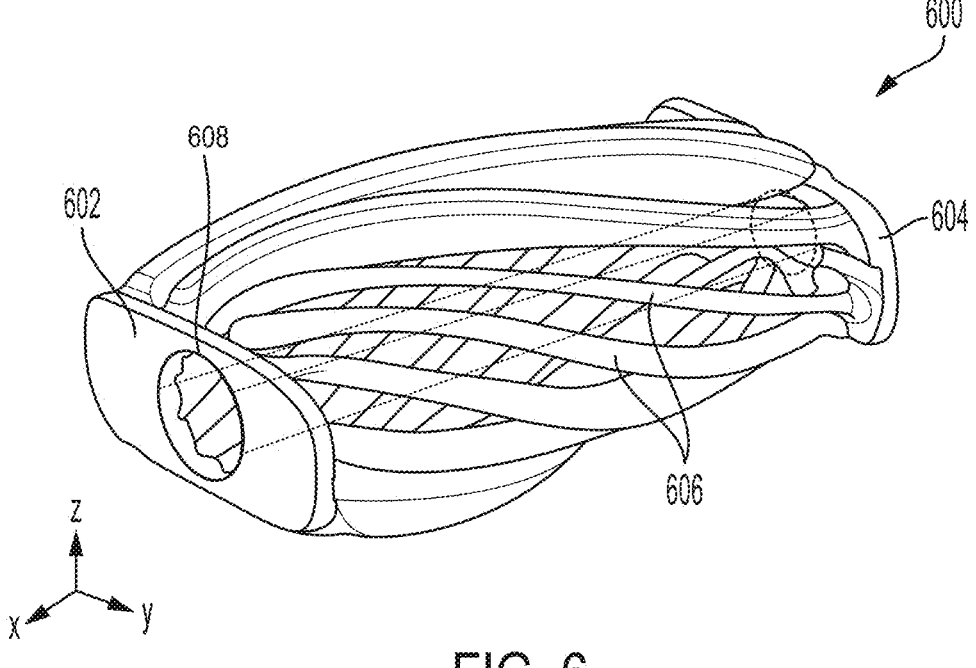
FIG. 6 shows another example of a spiral device for an exhaust assembly.

The following description relates to systems with an exhaust assembly that includes an exhaust component in an exhaust assembly of an exhaust system. FIG. 1 shows an engine system with an exhaust system. FIG. 2 shows an example of a vehicle system with a chassis. FIG. 3 shows an example of an exhaust component positioned adjacent to rear side of a vehicle chassis. FIG. 4 shows another example of an exhaust component that is arranged on a lateral side of a vehicle. FIGS. 5-6 show different examples of spiral devices for cooling exhaust conduits.

Referring to FIG. 1, internal combustion engine 10, comprising a plurality of cylinders, one cylinder of which is shown in FIG. 1, is controlled by electronic engine controller 12. The internal combustion engine 10 is included in a vehicle 13, in the illustrated example.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain or another suitable component. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42. Distributorless ignition system 88 provides an ignition spark to combustion chamber 30 via spark plug 92 in response to controller 12.

The engine 10 further includes an exhaust system 63 receiving exhaust gas from the combustion chamber 30. Universal Exhaust Gas Oxygen (UEGO) sensor 126 is shown coupled to exhaust manifold 48 upstream of catalytic converter 70 in the exhaust system 63. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 is shown in FIG. 1 as a conventional microcomputer including: microprocessor unit 102, input/output ports 104, read-excusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by human foot 132; a position sensor 154 coupled to caliper control pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed for processing by controller 12. A position sensor 118 may produce a predetermined number of equally spaced pulses each revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The vehicle 13 may be a hybrid vehicle, in one example. In such an example, the vehicle 13 includes an electric motor, a traction battery, and the like. In the hybrid vehicle example, the traction motor and the engine may have a variety of suitable architectures.

FIG. 2 shows an example of a vehicle 200 with a chassis 202. It will be understood that at least a portion of the components in the vehicle 13 shown in FIG. 1 may be included in the vehicle 200 shown in FIG. 2 and vice versa, in different embodiments.

The chassis 202 may include a frame 204, axles 206 with drive wheels 208, and the like. The chassis 202 includes a front side 210, a rear side 212, and lateral sides 214. It will be understood that an exhaust component may be arranged adjacent to or coupled to the chassis, in different examples. To elaborate, the exhaust component may be coupled to or arranged adjacent to the rear side 212 of the chassis 202, in one example, or one of the lateral sides of the chassis, in another example. Exemplary exhaust components are shown in FIGS. 3-4 and discussed in greater detail herein.

An axis system is provided in FIG. 2 as well as FIGS. 3-6, for reference. The z-axis may be a vertical axis (e.g., parallel to a gravitational axis), the x-axis may be a longitudinal axis (e.g., horizontal axis), and/or the y-axis may be a lateral axis, in one example. However, the axes may have other orientations, in other examples.

FIG. 3 shows an example of an exhaust assembly 300 with an exhaust component 302 that is coupled to exhaust conduit tips 304 and 306. There are specifically two exhaust conduit tips in the illustrated example. However, it will be understood that the exhaust assembly may include a single exhaust conduit tip or more than two exhaust conduit tips. The exhaust component 302 is positioned on a rear side 308 of a vehicle 310, in the illustrated example. In this way, the exhaust component may be easily accessed. It will be understood that the exhaust assembly 300 may be included in any of the previously described exhaust systems or combinations of the exhaust systems.

The exhaust component 302 includes a hooked portion 312. The hooked portion 312 allows the exhaust component to interface with a tow hook and a lift jack. In this way, the functionality of the exhaust assembly 300 is increased, thereby increasing customer appeal.

In the illustrated example, the hooked portion 312 includes a central section 314 and side sections 316 and 318. To elaborate, the exhaust component 302 may be symmetric about an axis 320. However, asymmetric exhaust component constructions have been contemplated.

An accessory mount 322 is arranged in the central section 314, in the illustrated example. The accessory mount 322 is configured to receive a pole 324 (e.g., a flag pole). A central axis of the accessory mount 322 may be vertically arranged to allow the pole to be vertically mounted, in one example.

The hooked portion 312 is positioned at least partially vertically below outlets 326 and 328 of the exhaust conduit tips 304 and 306. Further, the hooked portion 312 extends outwardly from in a rearward direction 313 from the exhaust conduit tips 304 and 306, in the illustrated example. In this way, obstruction of the exhaust conduits is reduced, thereby enhancing exhaust system performance.

The exhaust component 302 may be constructed out of one or more metallic material(s), polymer material(s), combinations thereof, and the like. The exhaust component 302 and the exhaust conduit tips 304 and 306 are positioned vertically below a bumper 330 in the illustrated example. However, the exhaust component and the exhaust tips may be arranged in other suitable locations in other examples.

The exhaust component 302 includes exhaust tip interfaces 332 and 334 that surround to the exhaust conduit tips 304 and 306. In one example, the exhaust tip interfaces 332 and 334 may not directly contact the exhaust conduit tips 304 and 306. To elaborate, a gap may be formed between the exhaust tip interfaces 332 and 334 and the exhaust conduit tips 304 and 306. However, in other examples, the exhaust tip interfaces may be directly coupled to the exhaust conduit tips via welding, adhesive, combinations thereof, and the like.

The hooked portion 312 includes a top surface 336, a bottom surface 338, and a vertical surface 340 that extends therebetween, in the illustrated example. However, other hooked portion contours have been contemplated. For instance, the hooked portion may include one or more curved surfaces. A gap 342 may be provided between the hooked portion 312 and the body of the exhaust component 302 to allow a towing hook to interface therewith.

The exhaust component 302 may be incorporated into the bumper 330. In other examples, the exhaust component 302 may be attached to a chassis of the vehicle (e.g., such as the chassis 202, shown in FIG. 2). Alternatively, the exhaust component 302 may be positioned adjacent to one of the frame rails of the chassis. Further, in other examples, the exhaust component may be formed integrally with a portion of the chassis.

FIG. 4 shows another example of an exhaust assembly 400 with an exhaust component 401 that is arranged on a lateral side 402 of a vehicle 404, in the illustrated example. However, the exhaust component 401 may be arranged in other suitable positions, such as on a rear side of the vehicle, as previously discussed.

The exhaust component 401 circumferentially surrounds exhaust conduit tips 406 and 408 that are included in the exhaust assembly 400, in the illustrated example. Specifically, a gap 409 is formed between the exhaust component 401 and the exhaust conduit tips 406 and 408. To elaborate, the gap 409 is formed between a lower surface 440, side surfaces 442 and 444, and an upper surface 446 of the exhaust component 401 and the outer surfaces 448 of the exhaust conduit tips 406 and 408. However, in other examples, the exhaust component 406 may be coupled to the exhaust gas tips. Similar to the other exhaust components described herein, the exhaust component 401 may be attached to a chassis of the vehicle or arranged adjacent to a portion of the chassis.

The exhaust component 401 again includes a hooked portion 410. In the example illustrated in FIG. 4, the hooked portion 410 extends in a direction across the component in a vertical and inboard direction. However, the hook may have other orientations, in alternate examples. Further, the hooked portion 410 may have a planar outer surface 412 to reduce the chance that the hook will interact with objects in the surrounding environment. Further, the hooked portion 410 may be arranged on a rear side 414 of the exhaust component 401.

The exhaust component 401 further includes an accessory mount 416, in the illustrated example. The accessory mount 416 is configured to receive a pole 418 and/or other suitable accessory. The hooked portion 410 is positioned vertically below the exhaust conduit tips 406 and 408 and the accessory mount 416 is positioned vertically above the exhaust conduit tips, in the illustrated example. In this way, the hook and the accessory mount may be more easily accessed. The accessory mount 416 may include a planar upper surface 419 and a planar lower surface 420.

The exhaust component 401 includes a rock slider 422 positioned on a lower side 424 of the component, in the illustrated example. In this way, rock strikes or other type of environmental object interaction are less likely to degrade the exhaust conduit tips 406 and 408. The rock slider 422 may include a planar surface 425 that is angled inward with regard to a vertical axis.

FIG. 5 shows an example of a spiral device 500 that may be coupled to an exhaust conduit such as any of the previously described exhaust conduits or combinations of the exhaust conduits. In the example illustrated in FIG. 5, the spiral device 500 includes spiral walls 502 that are arranged about a central axis 504. To elaborate, the spiral walls 502 may include opposing peripheral surfaces 506 and 508 which guide fluid in channels 510 formed between the spiral walls. An exhaust conduit 512 may extend through the spiral device 500. To elaborate, the spiral device 500 may be coupled to an exterior of the exhaust conduit 512. In such an example, the spiral walls 502 may terminate at the out surface of the exhaust conduit. The spiral walls 502 direct air around the exhaust conduit 512 to remove heat from the exhaust gas flowing therethrough without increasing exhaust back-pressure.

FIG. 6 shows another example of a spiral diffuser device 600 that may be at least partially enclosed within an exhaust conduit such as any of the previously described exhaust conduits or combinations of the exhaust conduits. The spiral device 600 shown in FIG. 6 includes a front section 602, a rear section 604, and spiral extensions 606 that extend between the front and the rear sections. An exhaust conduit 608 may extend through the spiral device 600 from the front section 602 to the rear section 604. The spiral extensions 606 direct airflow around the exhaust conduit 608 to remove heat from the exhaust gas flowing therethrough without increasing exhaust back-pressure.

The spiral devices described herein may be constructed via additive manufacturing, casting, and/or machining, in different example. Additively manufacturing the spiral devices allows a greater amount of heat to be removed from the exhaust gas with less backpressure generation.

FIGS. 3-6 are shown approximately to scale.

FIGS. 1-6 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As one embodiment, an exhaust component is provided that comprises a hooked portion configured as a tow hook and/or as a jack interface; where the hooked portion is positioned adjacent to an exhaust conduit tip; and where the hooked portion does not extend directly across the exhaust conduit tip. In one example, the exhaust component may further comprise an accessory mount. In another example, the accessory mount may include an opening configured to receive a pole. In yet another example, the accessory mount may be arranged on a central section of the hooked portion. In yet another example, the exhaust component may be positioned on a rear side of the vehicle chassis. In another example, the exhaust component may be positioned on a lateral side of the vehicle chassis. In another example, the exhaust component may further include a rock slider positioned on a lower side of the exhaust component below the exhaust conduit tip. In another example, the exhaust component may further comprise an accessory mount positioned above the exhaust conduit tip, where the hooked portion is positioned below the exhaust conduit tip. In another example, the exhaust component may further comprise a spiral device coupled to the exhaust conduit tip and configured to remove heat from an exhaust gas flow through the exhaust conduit. In yet another example, the spiral device may be additively manufactured.

In another embodiment, an exhaust assembly is provided that comprises an exhaust component and including: a hooked portion configured as a tow hook and/or as a jack interface; where the hooked portion is positioned adjacent to an exhaust conduit tip; and where at least a portion of the hooked portion is offset from an opening of the exhaust conduit tip. In one example, the hooked portion may be at least partially vertically offset from the opening. In another example, the exhaust component may be positioned on a rear side of the vehicle chassis. In yet another example, the hooked portion may be rearwardly offset from the opening. In another example, the exhaust component may be positioned on a lateral side of the vehicle chassis. In another example, the exhaust assembly may further comprise a rock slider positioned on a lower side of the exhaust component below the exhaust conduit tip. In another example, the exhaust assembly may further comprise an accessory mount positioned above the exhaust conduit tip, where the hooked portion is positioned below the exhaust conduit tip. In another example, the hooked portion may include an accessory mount and where the accessory mount includes an opening arranged on a central section of the hooked portion. In another example, the exhaust assembly may further comprise a spiral device arranged in the exhaust conduit tip and configured to remove heat from an exhaust gas flow through the exhaust conduit. In another example, the exhaust component may be directly coupled to the exhaust conduit tip.

In another representation an exhaust system assembly is provided that comprises an exhaust device that is attached to a chassis of an internal combustion engine vehicle, where the exhaust device is directly coupled to an exhaust outlet or positioned adjacent thereto and including a multi-function hook that does not directly obstruct the exhaust outlet.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust component, comprising:
a hooked portion configured as a tow hook and/or as a jack interface;
where the hooked portion is positioned adjacent to an exhaust conduit tip;
where the exhaust component circumferentially surrounds the exhaust conduit tip; and
where the hooked portion does not extend directly across the exhaust conduit tip.

2. The exhaust component of claim 1, where the hooked portion includes an accessory mount arranged on a central section of the hooked portion and where the accessory mount includes an opening configured to receive a pole.

3. The exhaust component of claim 1, where the exhaust component is mounted on a rear side of a vehicle chassis.

4. The exhaust component of claim 1, where the exhaust component is mounted on a lateral side of a vehicle chassis.

5. The exhaust component of claim 1, further comprising a rock slider positioned on a lower side of the exhaust component below the exhaust conduit tip.

6. The exhaust component of claim 5, further comprising an accessory mount positioned above the exhaust conduit tip, where the hooked portion is positioned below the exhaust conduit tip.

7. The exhaust component of claim 1, further comprising a spiral device coupled to the exhaust conduit tip and configured to remove heat from an exhaust gas flow through the exhaust conduit.

8. An exhaust assembly, comprising:
an exhaust component and including:
    a hooked portion configured as a tow hook and/or as a jack interface;
    where the hooked portion includes a top surface, a bottom surface, and a vertical surface that extends therebetween;
    where the hooked portion is positioned adjacent to two exhaust conduit tips;
    where two exhaust tip interfaces circumferentially surround the exhaust conduit tips; and
    where at least a portion of the hooked portion is offset from an opening of the exhaust conduit tips.

9. The exhaust assembly of claim 8, where the hooked portion is at least partially vertically offset from the opening.

10. The exhaust assembly of claim 9, where the exhaust component is mounted on a rear side of a vehicle chassis.

11. The exhaust assembly of claim 8, where the hooked portion is rearwardly offset from the opening.

12. The exhaust assembly of claim 11, further comprising an accessory mount positioned above the exhaust conduit tips, where the hooked portion is positioned below the exhaust conduit tips.

13. The exhaust assembly of claim 8, further comprising a spiral device coupled to the exhaust conduit tips and configured to remove heat from an exhaust gas flow through the exhaust conduits.

14. The exhaust assembly of claim 8, where the exhaust component is directly coupled to the exhaust conduit tips.

15. An exhaust assembly, comprising:
an exhaust component and including:
    a hooked portion configured as a tow hook and/or as a jack interface;
    where the hooked portion is positioned adjacent to two exhaust conduit tips;
    where the exhaust component circumferentially surrounds the exhaust conduit tips; and
    where at least a portion of the hooked portion is offset from an opening of the exhaust conduit tips.

16. The exhaust assembly of claim 15, where the hooked portion extends in a direction across the component in a vertical and inboard direction.

17. The exhaust assembly of claim 16, where the hooked portion has a planar outer surface.

18. The exhaust assembly of claim 15, further comprising a rock slider positioned on a lower side of the exhaust component below the exhaust conduit tips and an accessory mount positioned above the exhaust conduit tips.

19. The exhaust component of claim 15, where the exhaust component is mounted on a lateral side of a vehicle chassis.

20. The exhaust assembly of claim 15, further comprising a spiral device coupled to the exhaust conduit tips and configured to remove heat from an exhaust gas flow through the exhaust conduits.

\* \* \* \* \*